United States Patent
Tsai

[19]

[11] Patent Number: 6,061,320
[45] Date of Patent: May 9, 2000

[54] LOADING MECHANISM FOR DISC RECORDING AND/OR REPRODUCING DEVICES

[75] Inventor: Ching-Shiang Tsai, Taipei, Taiwan

[73] Assignee: Industrial Technology Research Institute, Hsinchu, Taiwan

[21] Appl. No.: 09/059,905

[22] Filed: Apr. 13, 1998

[51] Int. Cl.$^7$ .............................. G11B 33/12; G11B 17/04
[52] U.S. Cl. .......................................................... 369/75.2
[58] Field of Search ................................ 369/75.2, 77.1, 369/281; 360/92, 99.02, 99.06

[56] References Cited

U.S. PATENT DOCUMENTS

| | | | |
|---|---|---|---|
| 4,654,840 | 3/1987 | Takahashi | 369/75.2 |
| 4,680,748 | 7/1987 | Kobayashi | 369/77.1 |
| 5,128,918 | 7/1992 | Suzuki et al. | 369/77.1 |
| 5,204,850 | 4/1993 | Obata | 369/75.2 |
| 5,768,238 | 6/1998 | Tanaka | 369/75.2 |
| 5,878,013 | 3/1999 | Maeda et al. | 369/77.1 |

FOREIGN PATENT DOCUMENTS

0820058A  1/1998  European Pat. Off. .

*Primary Examiner*—David L. Ometz
*Assistant Examiner*—Angel Castro
*Attorney, Agent, or Firm*—W. Wayne Liauh

[57] ABSTRACT

A disk loading mechanism for a compact disk (CD) device. It contains a frame, a CD tray, and a transmission unit. The transmission unit includes a base plate slidable within an opening of the frame. The base plate has a motor and a set of gears mounted thereon. A transversal rack is mounted on the frame which is engagable with the gear set for causing a transverse movement of the entire transmission unit, which, in turn, causes a vertical movement of the front end of a reading device. The gear set is also engagable with a substantially straight longitudinal rack formed on the CD tray so as to cause a longitudinal movement of the CD tray between a reading position and a loading/unloading position. The transmission unit also includes a vertical pin formed on the base plate which is received and slidable within a guiding path formed on the CD tray.

5 Claims, 15 Drawing Sheets

LOADING MECHANISM FOR DISC RECORDING AND/OR REPRODUCING DEVICES

BACKGROUND OF THE INVENTION

1. Field of the Invention

The present invention relates to a disk loading mechanism for a compact disk (CD) Recording and/or Reproducing Device, particularly to a disk loading mechanism for a CD Recording and/or Reproducing Device with increased stability and reduced vibrations during operation.

2. Description of Related Art

Conventional disk loading mechanisms such as U.S. Pat. No. 4,759,008 Loading mechanism for disk player and U.S. Pat. No. 5,144,612 Disk loading device for a CD Recording and/or Reproducing Device with a reading device uses a toothed wheel with cams to drive the motion of the reading device for clamping and releasing a CD. The CD is clamped and unclamped by the movement of a toothed sector. This arrangement, however, does not provide uniform support for the reading device. Therefore, during rotation of the CD vibrations easily develop, impairing the reliability of reading data. A conventional disk loading mechanism for a CD Recording and/or Reproducing Device apparently still needs improving.

SUMMARY OF THE INVENTION

The main object of the present invention is to provide a disk loading mechanism for a CD Recording and/or Reproducing Device with increased stability and reduced vibrations during operation, so as to increase the reliability of reading data.

Another object of the present invention is to provide a disk loading mechanism for a CD Recording and/or Reproducing Device with a simple structure and a small number of components, allowing for easy assembly.

The present invention can be more fully understood by reference to the following description and accompanying drawings.

DETAILED DESCRIPTION OF THE PREFERRED EMBODIMENT

Figure 1:
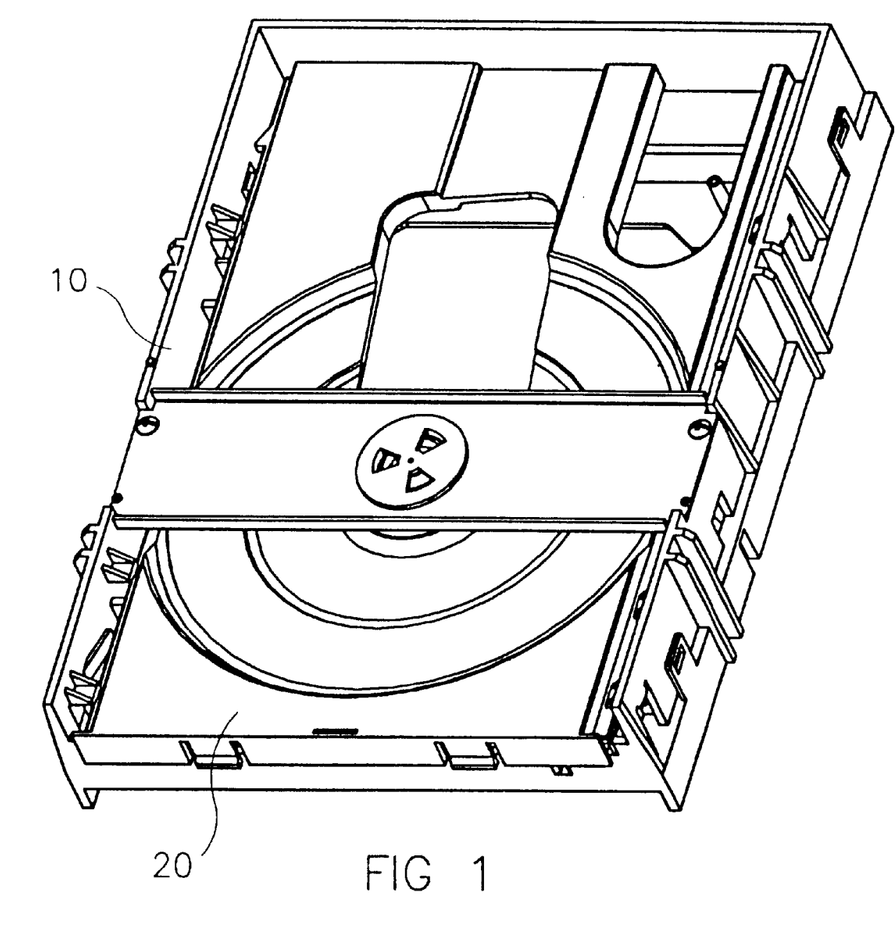
FIG. 1 is a perspective view of the disk loading mechanism for a CD Recording and/or Reproducing Device of the present invention.
Figure 2:
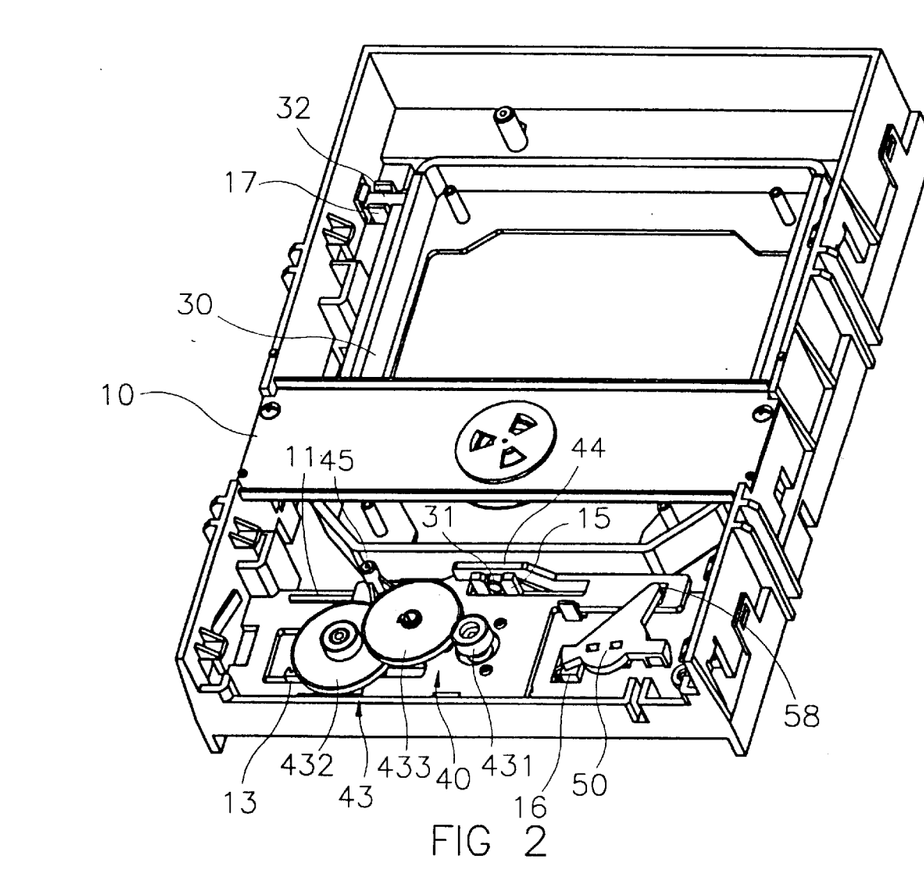
FIG. 2 is a perspective view of the disk loading mechanism for a CD Recording and/or Reproducing Device of the present invention after dismounting the tray for the CD.

The disk loading mechanism of the present invention is used in a CD Recording and/or Reproducing Device, having a CD reading device (not shown in the figure) for reading a compact disk (CD), moving between a loading/unloading state for loading/unloading a CD and a reading state for reading a CD. As shown in FIGS. 1 and 2, the disk loading mechanism for a CD Recording and/or Reproducing Device of the present invention mainly comprises: a frame 10 with a front side; a tray 20 with a lower side and an upper side for carrying the CD; a reading device support 30 with a front end and a rear end for supporting the reading device (not shown); and a transmission unit 40 for driving the tray 20, so as to mount and dismount the CD.

Figure 3:
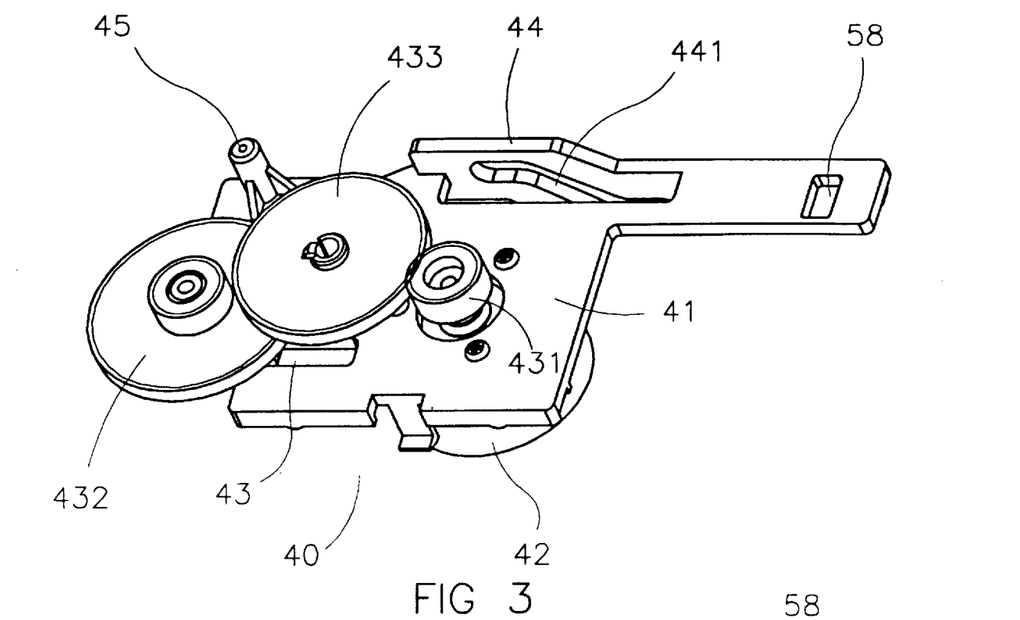
FIG. 3 is a perspective view of the transmission unit of the present invention from the front side thereof.
Figure 4:
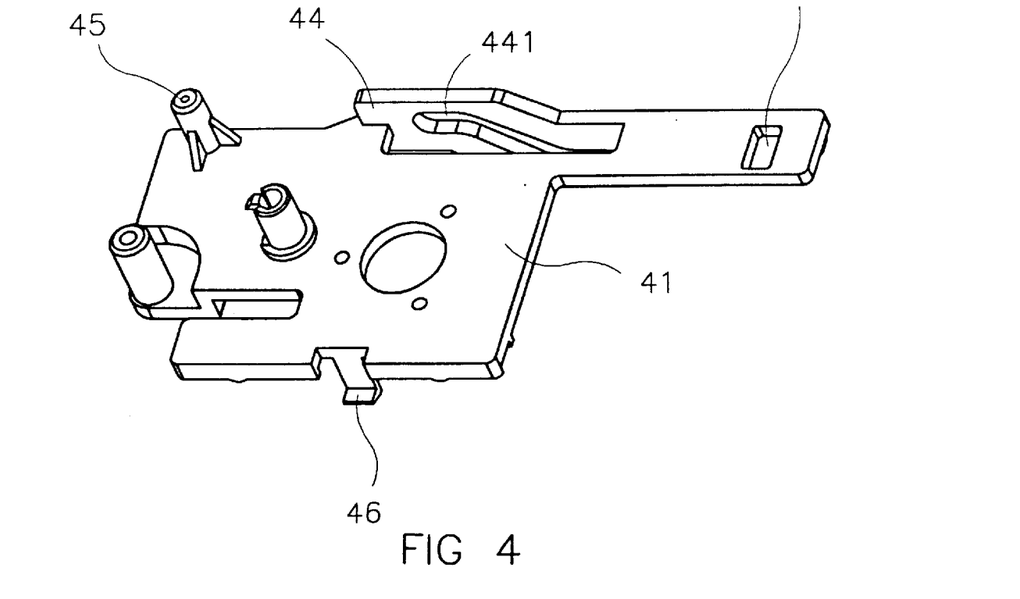
FIG. 4 is a perspective view of the base plate of the transmission unit of the present invention from the front side thereof.
Figure 5:
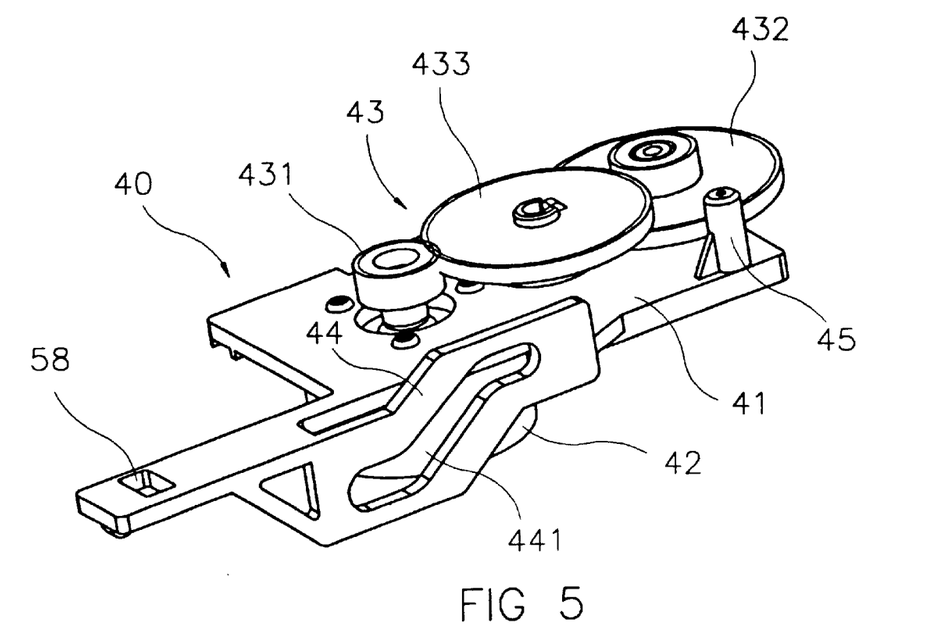
FIG. 5 is a perspective view of the transmission unit of the present invention from the rear side thereof.

The transmission unit 40 is fastened on the lower side of the tray 20, next to the front end of the reading device support 30. As shown in FIG. 3, the transmission unit 40 comprises a base plate 41 with an upper side and a lower side; a motor 42 with a drive shaft; and a set of gears 43. The base plate 41 has a rear edge, which leans against the front end of the reading device support 30. As shown in FIGS. 4 and 5, a vertical guiding plate 44 is attached to the rear edge of the base plate 41. A groove 441 is cut into the guiding plate 44. The groove 441 is inclined for guiding the reading device support 30 in a vertical movement, when shifted horizontally, for holding and releasing the CD, as explained below. A vertical pin 45 extends upward from the base plate 41 into a guiding path 22 on the lower side of the tray 20, shown in FIG. 10. At least one hook 46 on the lower side of the base plate 41 serves to fix the base plate 41 on the frame 10.

Figure 6:
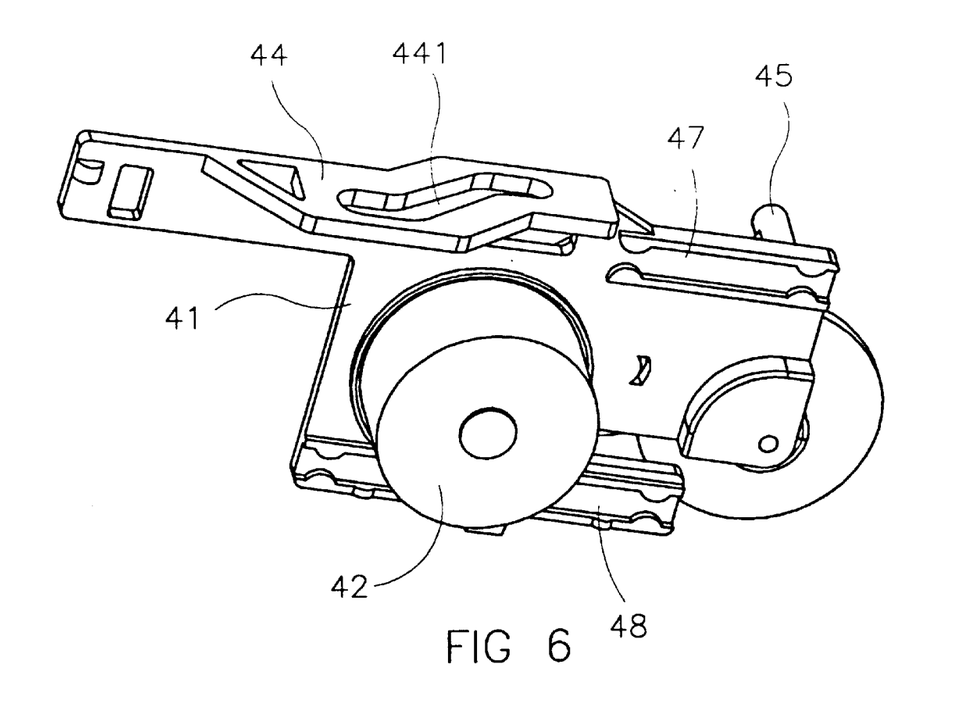
FIG. 6 is a perspective view of the transmission unit of the present invention from the lower side thereof.

Referring to FIG. 6, the base plate 41 has on the lower side thereof several guiding paths 47, 48. The frame 10 has rails 11, 12, shown in FIG. 8, which run along the guiding paths 47, 48, defining a transverse direction. Thus the base plate 41 is allowed to slide on the frame 10 along the rails 11, 12. The frame 10 further has a transversal rack 13 along the transverse direction.

Figure 7:
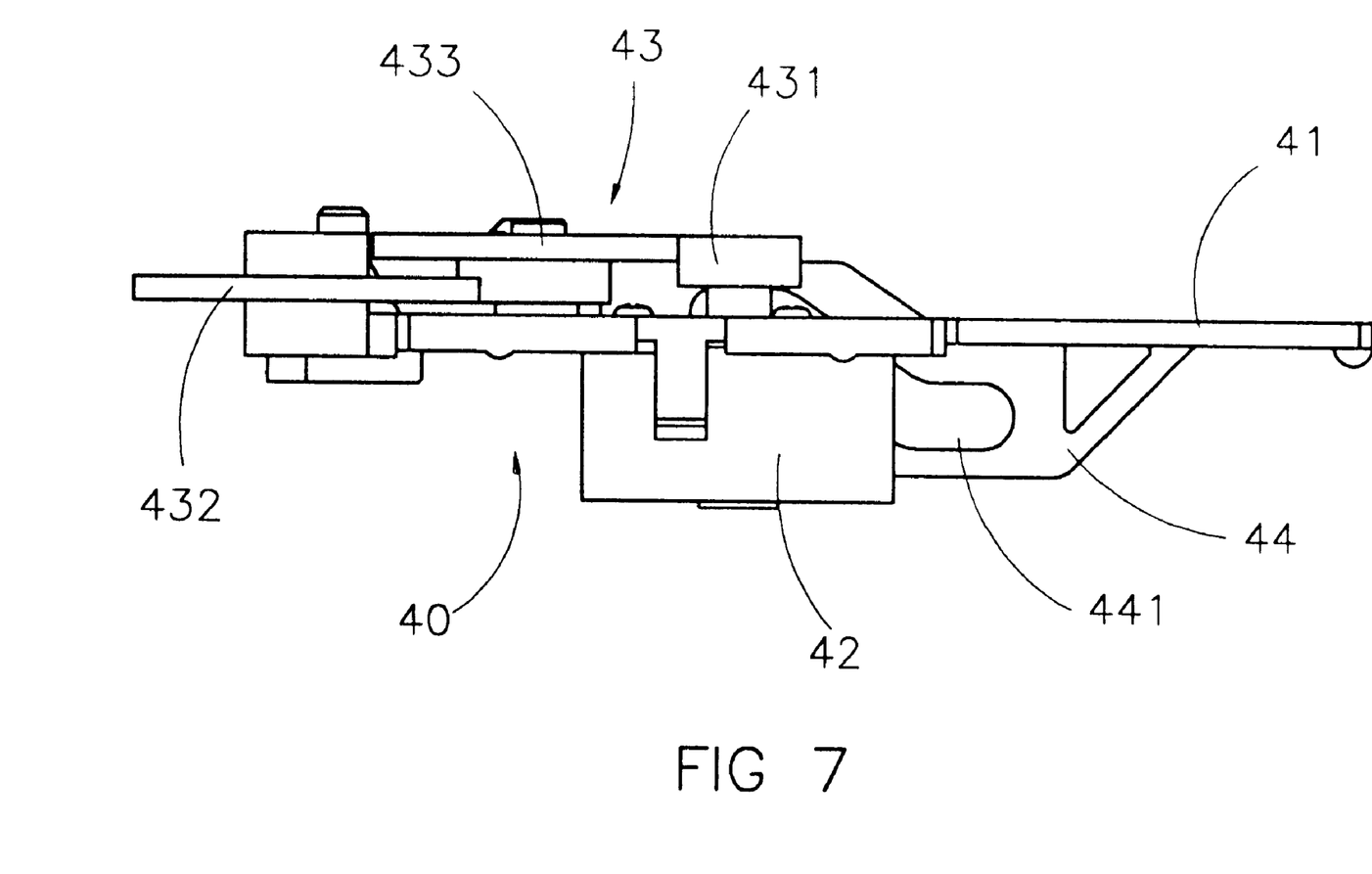
FIG. 7 is a front view of the transmission unit of the present invention.
Figure 8:
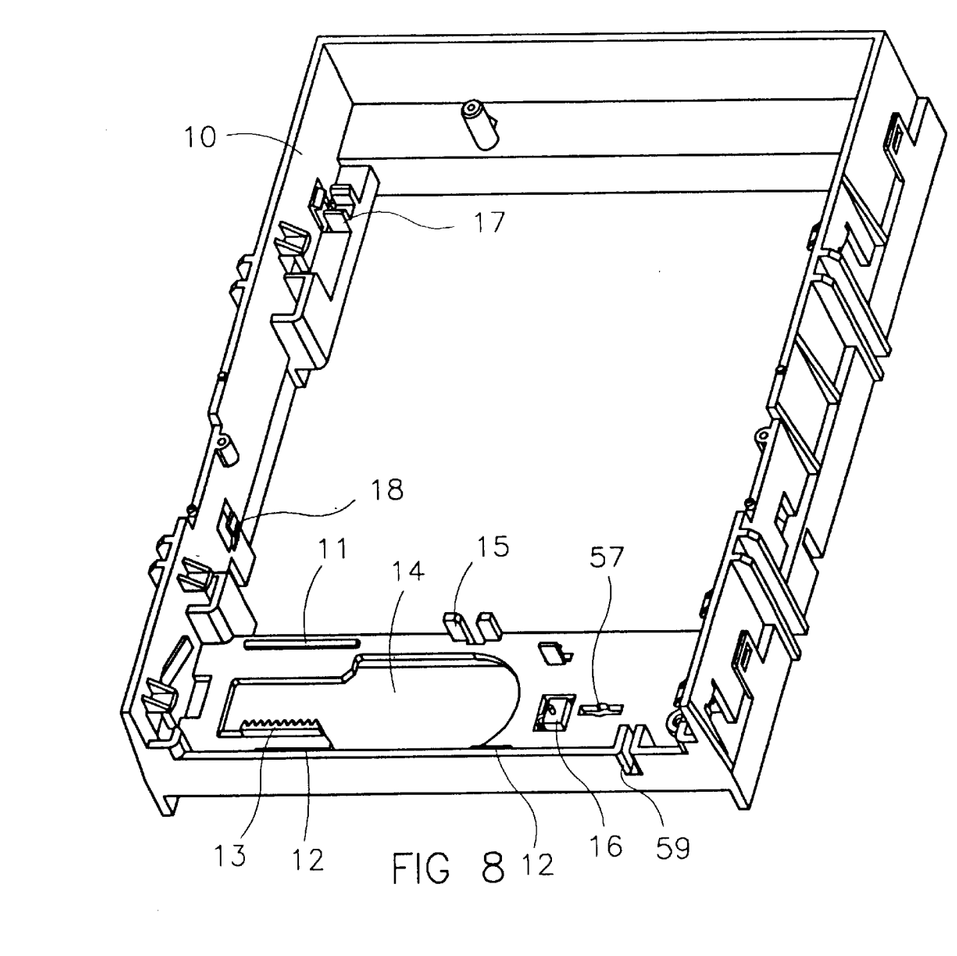
FIG. 8 is a perspective view of the frame of the present invention.
Figure 11:
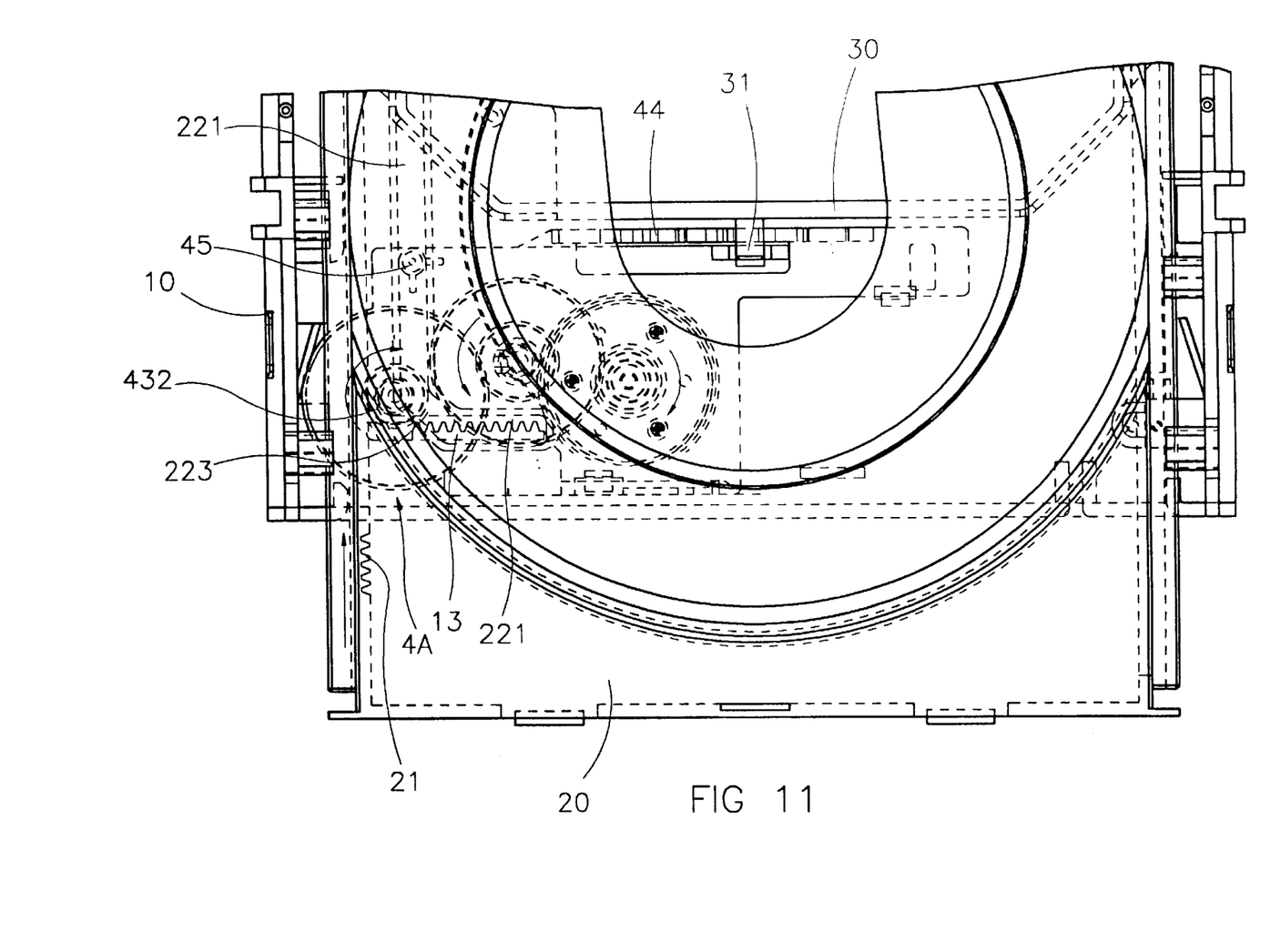
FIG. 11 is a top view of the tray and the transmission unit of the present invention in the unloading state.

Referring to FIGS. 7 and 11, the set of gears 43 comprises: a first gear wheel 431 with a single gear, mounted on the drive shaft of the motor 42; a second gear wheel 432, engaging with the transversal rack 13, as shown in FIGS. 2 and 8, and having three concentric gears; and a third gear wheel 433 with two concentric gears. The two gears of the third gear wheel 433 respectively engage with the first gear wheel 431 and one of the gears of the second gear wheel 432, such that the second gear wheel 432 is driven by the first gear wheel 431.

Referring to FIG. 8, an accommodating opening 14 is cut into the frame 10 for accommodating the transmission unit 40. The transmission unit 40 is movable within the accommodating opening 14, guided by the rails 11, 12 and driven by the second gear wheel 432 engaging with the transversal rack 13. Close to the front end of the reading device support 30, the frame has a vertical guiding element 15. The reading device support 30 has a positioning pin 31, which extends into the guiding element 15 of the frame 10. As shown in FIG. 2, the pin 31 passes through the groove 441. When the transmission unit 40 moves along the transverse direction, the pin 31 moves along the groove 441 and is thereby guided upward or downward. Accordingly, the front end of the reading device support 30 undergoes a vertical movement. A sensor 16 on the frame detects whether the disk loading mechanism of the present invention is in the reading state or not.

Figure 9:
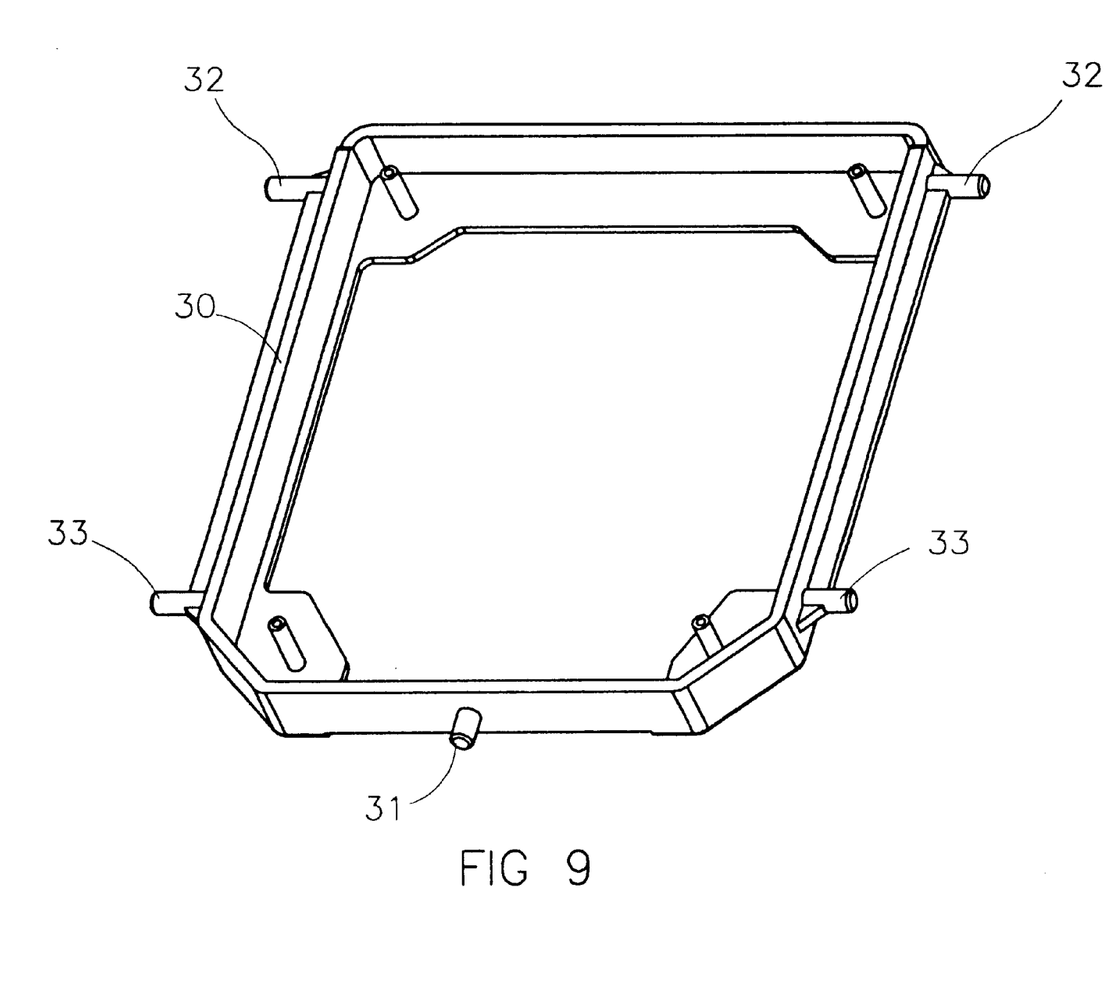
FIG. 9 is a perspective view of the reading device (not shown in the figure)support of the present invention.

Referring to FIG. 9, the reading device support 30 carries the CD reading device and is formed as a roughly rectangular frame. Two pins 32, which are aligned in the transverse direction, extend away from the reading device support 30, close to the rear end thereof. The frame 10 has two bearings 17, into which the pins 32 are laid, serving as a hinge for the reading device support 30 when the front end thereof is moved upward or downward for holding or releasing a CD, respectively. The reading device support 30 further has close to the front end thereof two pins 33, which are aligned in the transverse direction, extending outward. The pins 33 press against two plate-springs 18 on the inner side of the frame 10. The plate-springs 18 secure the transverse position of the reading device support 30 during the movement thereof.

Referring again to FIG. 2, the pin 31 on the front end of the reading device support 30 is guided by the groove 441 in the guiding plate 44 of the transmission unit 40. At the same time, any transverse movement of the pin 31 is blocked by the guiding element 15 of the frame 10. Thus, when the transmission unit 40 moves in the transverse direction, the pin 31 is driven upward or downward, leading to the vertical movement of the front end of the reading device support 30, with the pins 32 in the bearings 17 as hinges.

Figure 10:
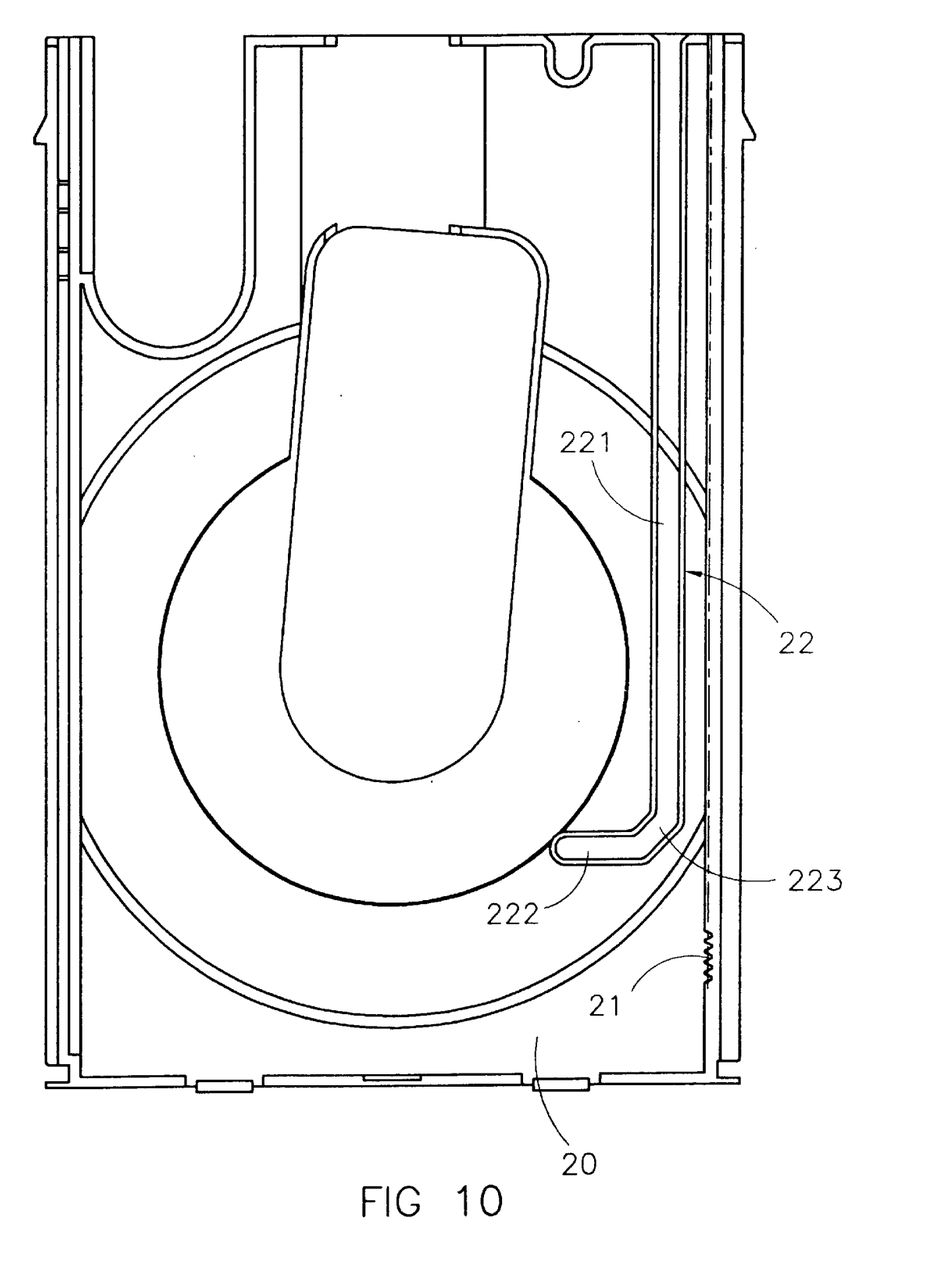
FIG. 10 is a bottom view of the tray of the present invention.

As shown in FIG. 10, the tray 20 has a longitudinal rack 21, engaged with one gear of the second gear wheel 432. The guiding path 22 on the lower side of the tray 20 is glidingly movable against the vertical pin 45 of the transmission unit 40.

Figure 12:
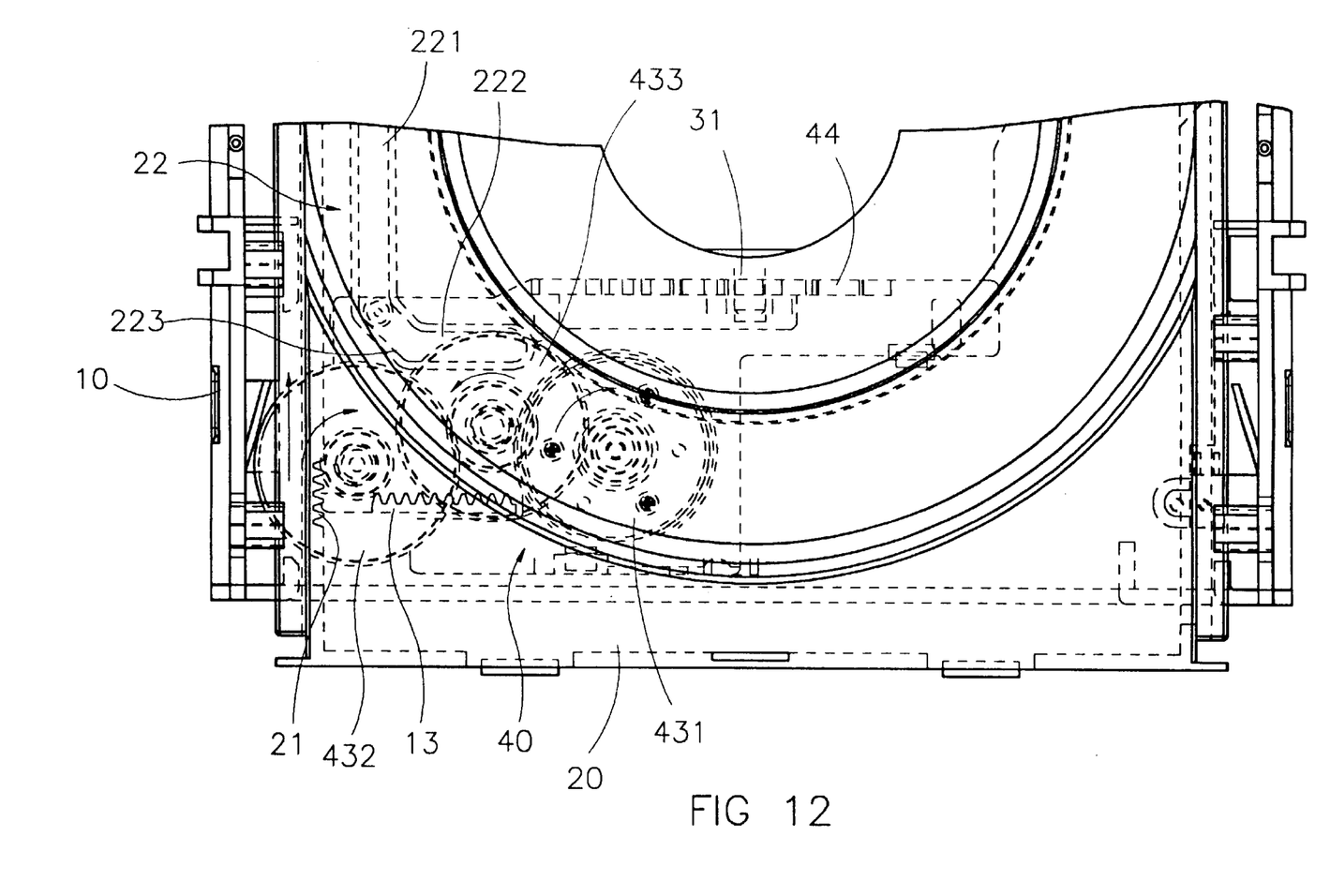
FIG. 12 is a top view of the tray and the transmission unit of the present invention at the transition to the reading state.
Figure 13:
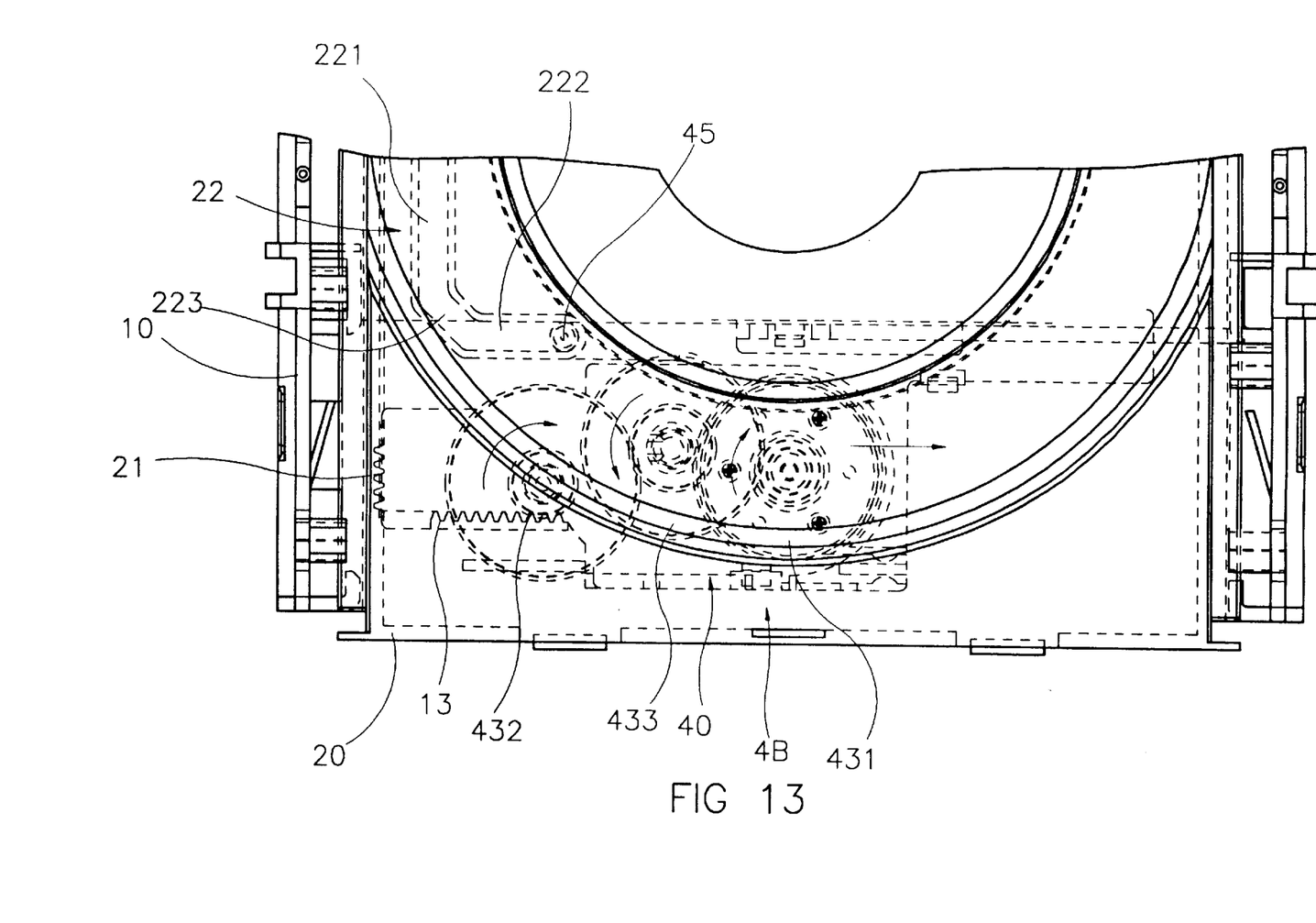
FIG. 13 is a top view of the tray and the transmission unit of the present invention in the reading state.

Referring to FIGS. 11–13, the disk carrying system for a CD Recording and/or Reproducing Device of the present invention during operation performs a movement as follows: The motor 40 drives the set of gears 43. The set of gears 43 engages with the longitudinal rack 21, pushing the tray 20 backward into a reading position for reading a CD or forward into a loading/unloading position for loading or unloading a CD. At the same time, the tray 20 is guided by the vertical pin 45 of the transmission unit 40 gliding along the guiding path 22. The set of gears 43 further engages with the transversal rack 13, pushing the transmission unit 40 in the transverse direction.

As shown in FIG. 11, in the loading/unloading state of the present invention, the transmission unit thereof takes on a transverse position 4A, which is close to the left side of the frame. In position 4A, the second gear wheel 432 is disengaged from the transversal rack 13, but engaged with the longitudinal rack 21. From this position, rotating the motor 42 drives the tray 20 backward or forward. As shown in FIGS. 10 and 11, the guiding path 22 on the lower side of the tray 20 is roughly shaped like the letter L, having a longitudinal section 221 and a transverse section 222, which are connected by an oblique section 223. The transverse position of the longitudinal section 221 is the same as the transverse position of the vertical pin 45 in position 4A, allowing the vertical pin 45 in position 4A to glide in the guiding path 22, while the tray 20 is pushed backward or forward.

As shown in FIGS. 10–12, when the tray 20, starting from the loading/unloading position, is driven backward to the point where the vertical pin 45 has reached the oblique section 223 of the guiding path 22, any further movement of the tray 20 backward drives the vertical pin 45 and thus the whole transmission unit 40 to the right. At this moment, the second gear wheel 432 starts to engage with the transversal rack 13, actively driving the transmission unit 40 further to the right, with the vertical pin 45 reaching and gliding along the transverse section 222 of the guiding path 22. At the same time, the pin 31 of the reading device support 30 is guided by the groove 441 on the guiding plate 44, causing the reading device support 30 to be pushed upward.

As shown in FIG. 13, the transmission unit 40 finally reaches a transverse position 4B to the right. Then the tray 20 and the reading device support 30 have attained the reading position.

Figure 14:
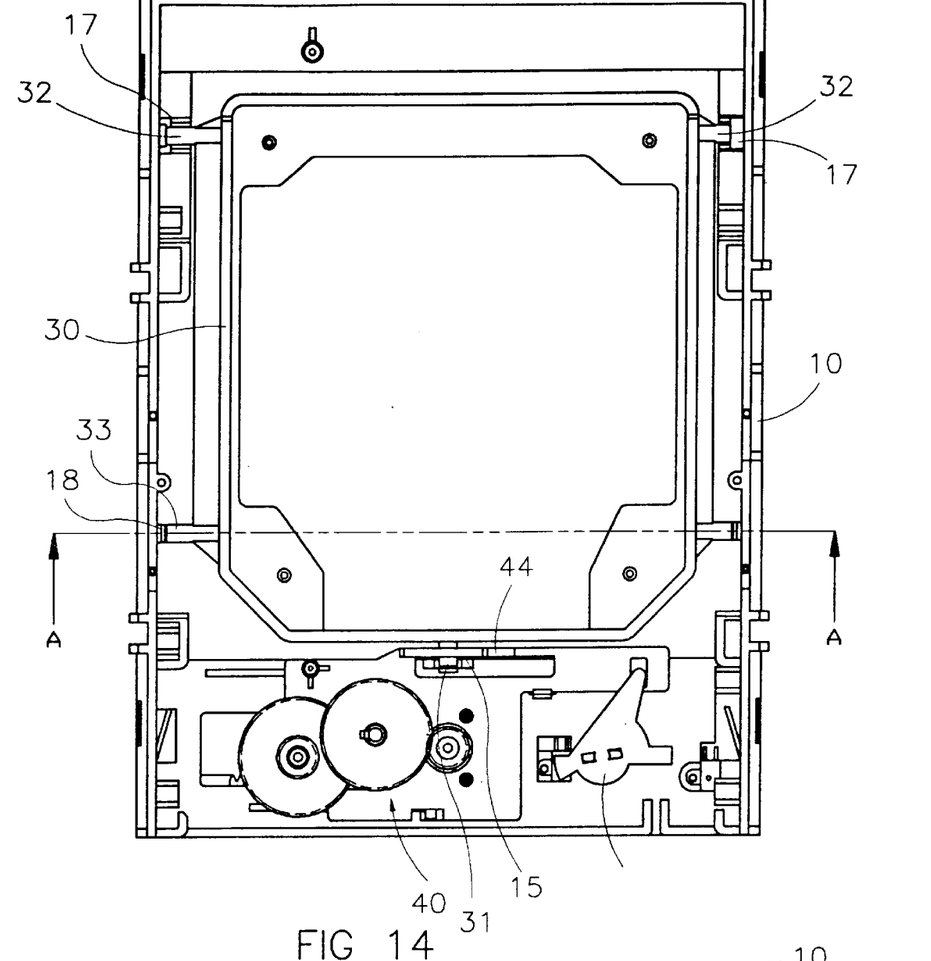
FIG. 14 is a top view of the disk loading mechanism for a CD Recording and/or Reproducing Device of the present invention in the reading state.
Figure 15:
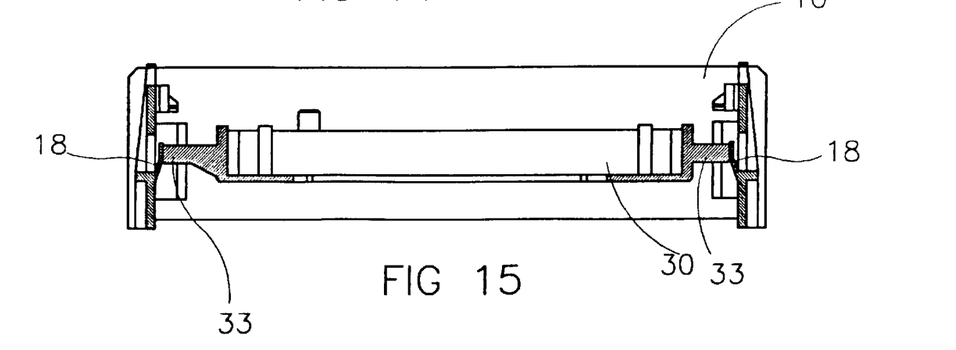
FIG. 15 is a sectional view, taken along line A—A of FIG. 14.
Figure 16:
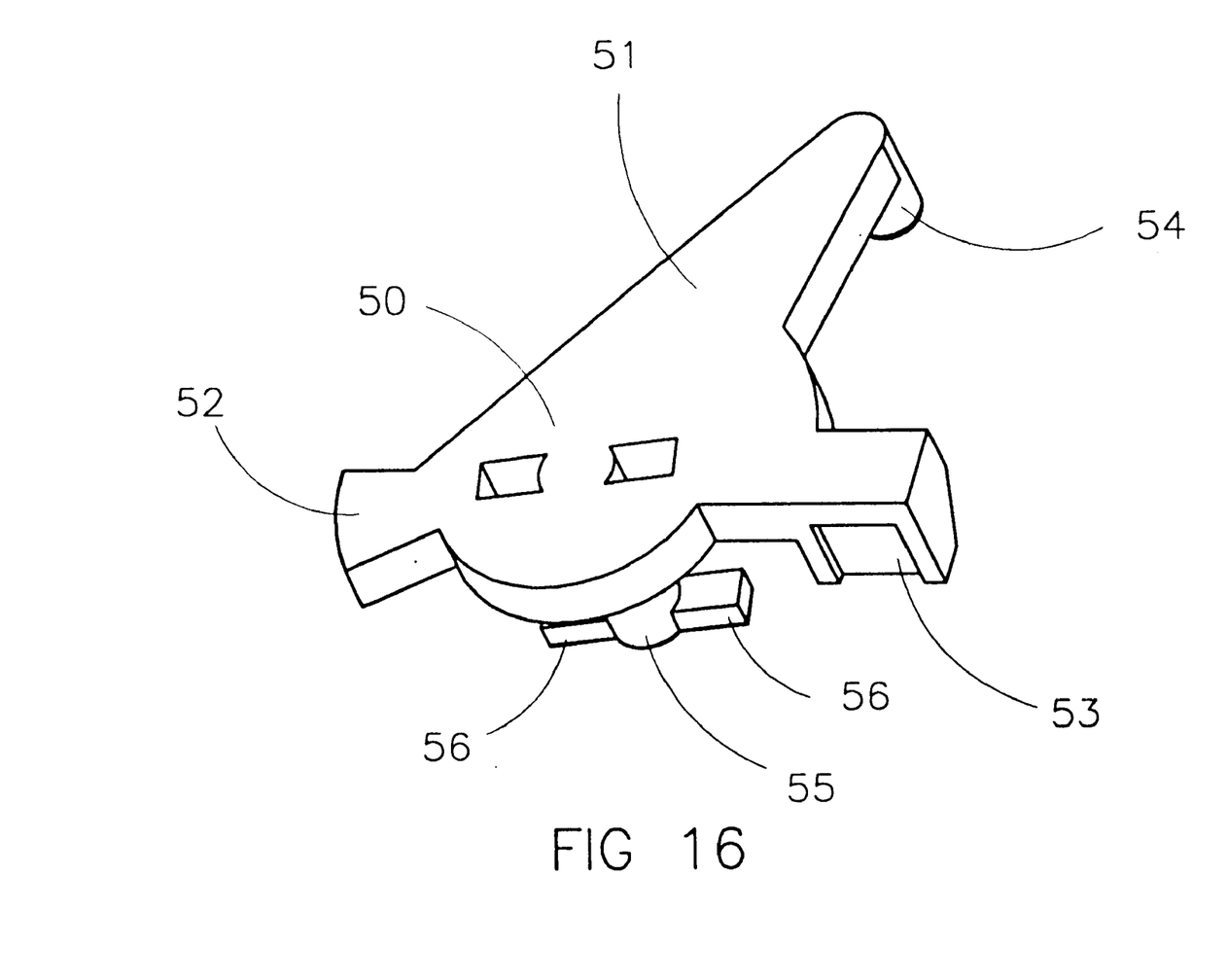
FIG. 16 is a perspective view of the emergency ejection lever of the present invention.

Referring to FIGS. 14 and 15, in the reading state of the present invention, the plate-springs 18 press on the pins 33 of the reading device support 30, stably holding the reading device support 30. On the whole, the reading device support 30 is supported on five points, the lateral pins 32 on the rear end, the lateral pins 33 on the front end, and the front pin 31. So the stability of the reading device and thus the reliability of read data are increased. Referring to FIG. 16, the frame 10 is, on the side opposite to the longitudinal rack 21 of the support plate 20, provided with an emergency ejection lever 50, allowing to eject a CD in case of a power failure or a defect of the CD Recording and/or Reproducing Device. The emergency ejection lever 5( comprises: a lever arm 51 with a near end and a far end; a trigger part 52; and a pushing part 53; a hook 54 on the far end of the lever arm 51; and a shaft 55.

The emergency ejection lever 50 performs a rotary movement around the shaft 55 thereof. The shaft 55 is vertically oriented, extending downward from the near end of the lever arm 51 and having a lower end. Two wings 56 extend horizontally away from the lower end of the shaft 55. As shown in FIG. 8, the frame 10 has a keyhole-like hole 57, allowing the shaft 55 with the wings 56 to pass through at a certain angular position of the emergency ejection lever 50. When turned in the hole 57, the emergency ejection lever 50 is blocked from being removed from the frame 10.

Figure 17:
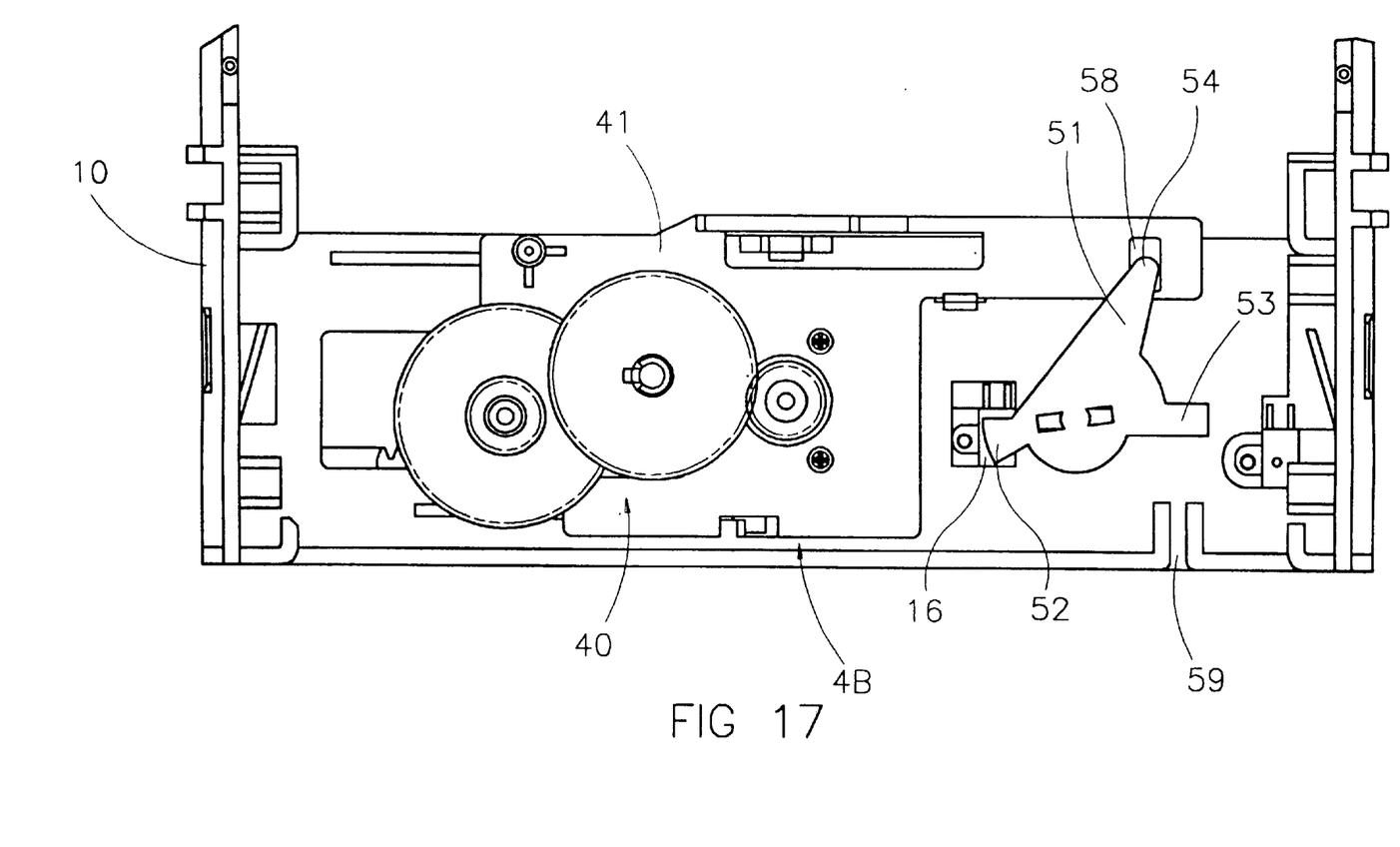
FIGS. 17 and 18 are schematic illustrations of the movement during emergency ejection of a CD in the present invention.
Figure 18:
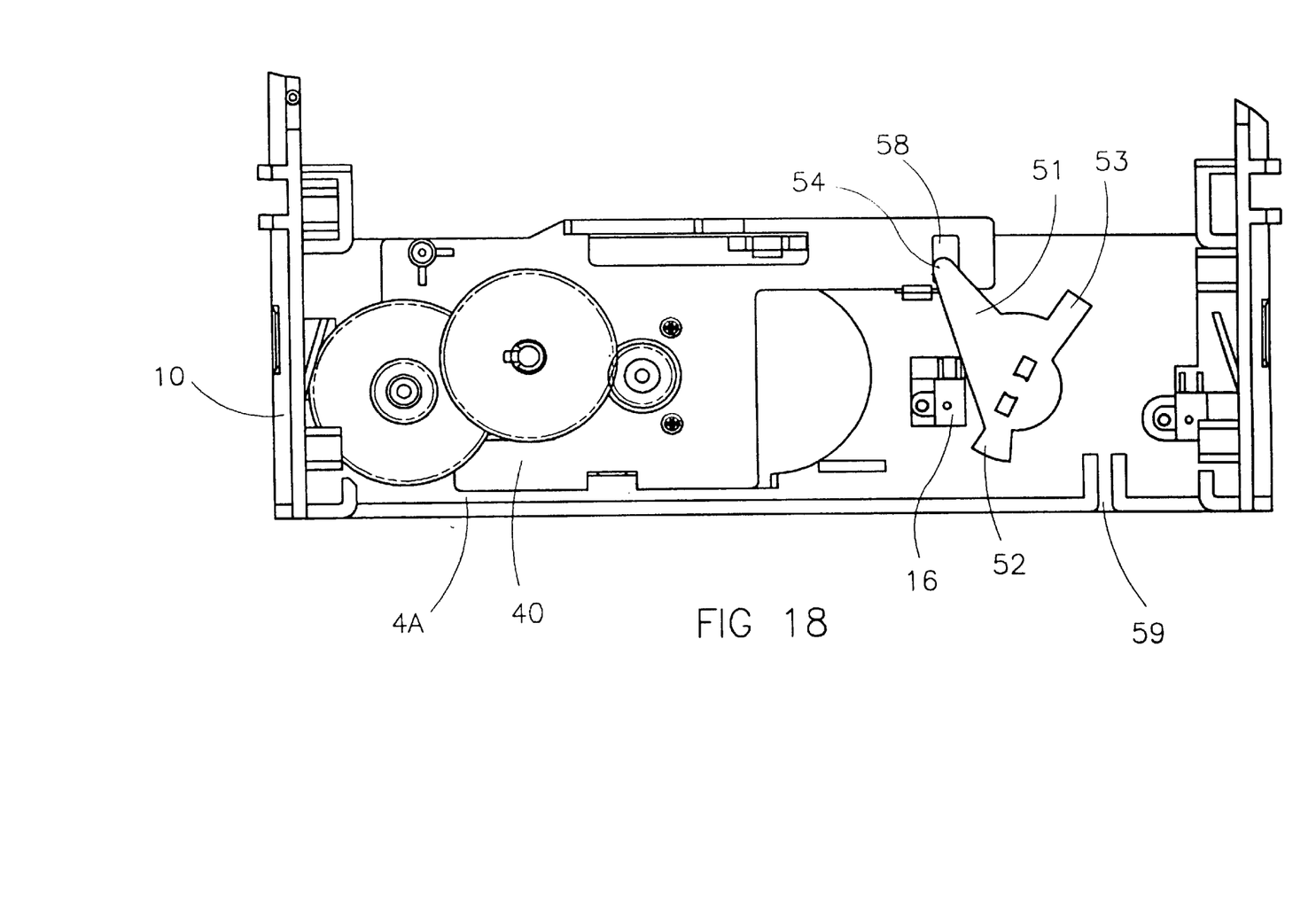

Referring to FIGS. 17 and 18, the base plate 41 of the transmission unit 40 close to the emergency ejection lever 50 has an opening 58, passed through by the hook 54 on the far end of the lever arm 51. Thus any movement of the transmission unit in the transverse direction is correlated to turning the emergency ejection lever 50 around the shaft 55.

As shown in FIG. 17, in the reading state, the trigger part 52 touches the sensor 16 for indicating that the reading state has been reached. At this time, the pushing part 53 is oriented in the transverse direction. The frame 10 has on the front side thereof an opening 59 at the same transverse position as the pushing part 53 in the reading state. The opening 59 allows to push back the pushing part 53 with an elongated object. Then the emergency eject lever 50 is turned around the shaft 55, as shown in FIG. 18, causing the lever arm 51 to drive the transmission unit 40 to the left, until the vertical pin 45 enters the oblique section 223 of the guiding path 22 on the tray 20, pushing the tray 20 forward. Then the tray 20 can be pulled out of the frame 10 manually for dismounting a CD thereon.

The disk loading mechanism for a CD Recording and/or Reproducing Device of the present invention increases the reliability of reading data on a CD and at the same time needs only a single motor for its movements. Thus the present invention has a simple structure with few modules, simplifying the assembly thereof. Furthermore, only a small volume is required to accommodate the present invention, leaving more flexibility in design.

While the invention has been described with reference to a preferred embodiment thereof, it is to be understood that modifications or variations may be easily made without departing from the spirit of this invention which is defined by the appended claims.

I claim:

1. A disk loading mechanism for a compact disk (CD) device, having a reading device for reading a CD, said disk loading mechanism comprising:

a frame, an opening formed in said frame, and a transversal rack formed on said frame;

a tray, which is slidingly movable within said frame in a longitudinal direction between a loading/unloading position for loading and unloading said CD and a reading position for reading said CD and which has a substantially straight longitudinal rack;

a reading device support for supporting said reading device, having a front end and a rear end with two aligned pins, which are oriented in a transverse direction and serve as hinges, such that said front end is allowed a vertical movement; and a transmission unit, movable in a transverse movement between a transverse loading/unloading position and a transverse reading position, said transmission unit comprising:

a horizontally disposed base plate which is movable within said opening of said frame;

a vertically extending guiding plate affixed on a rear end of said base plate, for causing a vertical movement of said front end of said reading device support upon a transverse movement of said transmission unit;

a motor and a set of gears engageable with said motor, both said motor and said set of gears being mounted on said base plate;

wherein said set of gears are engageable with either said transversal rack or said longitudinal rack, such that when said set of gears are engaged with said transversal rack, said motor causes a transverse movement of said transmission unit and thus a vertical movement of said front end of said reading device, and when said set of gears are engaged with said longitudinal rack, said motor causes a longitudinal movement of said tray between said reading position and said loading/unloading position.

2. A disk loading mechanism according to claim 1, wherein said reading device support close to said front end thereof has two transverse aligned pins, which are held between two plate-springs on said frame.

3. A disk loading mechanism according to claim 1, having an emergency ejection lever, which is turnable around a turning axis, further comprising:

a lever arm with a near end on said turning axis and a far end, with a hook attached to said far end, which enters an opening in said transmission unit; and a pushing part;

wherein said emergency ejection lever is turned by pushing said pushing part manually with an elongated object reaching through a hole in said frame, causing said lever arm to drive said transmission unit away from said transverse reading position thereof, allowing said support plate to be pulled manually into said loading/unloading position thereof.

4. A disk loading mechanism according to claim 3, wherein said emergency ejection lever further has a triggering part, touching a sensor, when said transmission unit is in said transverse reading position to indicate said reading position.

5. A disk loading mechanism according to claim 1, wherein:

said transmission unit has a vertical pin formed on said base plate;

said tray has a guiding path, positioned close to one longitudinal side thereof, for receiving and allowing said vertical pin to glide therein; and said guiding path having a longitudinal section, a transverse section, and an oblique section connecting said longitudinal section and said transverse section.

* * * * *